Figure 1:
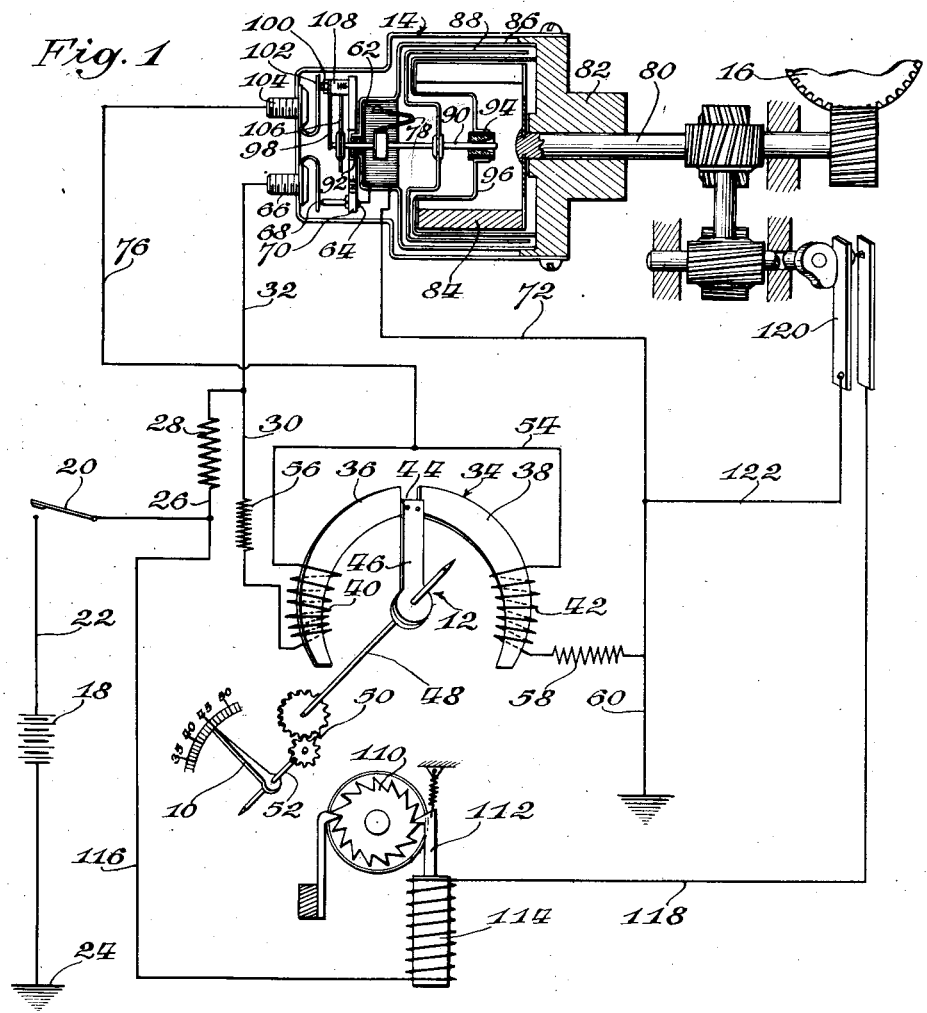

May 23, 1939.　　　H. M. NORMAN　　　2,159,340

ELECTRIC SPEEDOMETER

Filed Feb. 26, 1937

Inventor:
Horace M. Norman
By Williams, Bradbury,
McCaleb & Hinkle
Attys.

Patented May 23, 1939

2,159,340

UNITED STATES PATENT OFFICE 2,159,340

ELECTRIC SPEEDOMETER

Horace M. Norman, Chicago, Ill., assignor to Stewart-Warner Corporation, Chicago, Ill., a corporation of Virginia Application February 26, 1937, Serial No. 127,845

10 Claims. (Cl. 175—183)

The present invention pertains to electric speedometers particularly adapted for use with automobiles in which the engine is located at the rear of the vehicle, and is an improvement on the electric speedometer disclosed in application Serial No. 754,522, filed November 23, 1934, and application Serial No. 40,600, filed September 14, 1935.

In the electric speedometers forming the subject matter of the above mentioned applications, a pair of series connected solenoids adapted to actuate an armature member in opposite directions are connected in parallel with a fixed resistance across the battery of the vehicle. An electrical bridge connection having one end in sliding contact with the fixed resistance and the other end connected to the conductor connecting the solenoids in series, is provided for the purpose of proportioning the flow of current to the solenoids in response to the speed of the vehicle. The point of contact between the sliding contact and fixed resistance is determined by the speed of the vehicle, and thus the current flowing through each solenoid is likewise made to depend upon the speed.

The force exerted upon the armature member, or members, if two separate armature members are used, as shown in the earlier filed of the two applications mentioned above, is dependent upon the current flowing through the solenoids. The current in turn is dependent upon the battery voltage and the resistance of the solenoids.

In the applications referred to, variations in battery voltage are compensated for by a ballast resistance having a high positive temperature coefficient of resistance placed in series between the battery and speedometer circuit. Thus, when the battery voltage is low, the amount of current flowing through the ballast resistance is relatively small, and the resistance of the ballast resistance also is relatively small. However, when the battery voltage rises, the current flow through the circuit tends to increase and results in a rise in the temperature of the ballast resistance. The rise in temperature increases the value of the resistance and there results a decrease in the current flow. Thus the value of the current flowing through the circuit is maintained within relatively narrow limits.

When the movable contact of the bridge connection is at the midpoint of the fixed resistance, no current flows through the bridge connection and the same current flows through both solenoids. The solenoids being constructed alike are heated to the same temperature and have the same resistance. However, as the movable contact moves to one end or the other of the fixed resistance from the midpoint thereof, more current flows through one of the solenoids. The temperature of this solenoid increases and that of the other decreases, with the result that the current flowing through the solenoids is no longer a function of the position of the movable contact alone, but is also dependent upon the resistance of the solenoid. This results in an error in the reading of the speedometer.

In the aforementioned applications, this error resulting from variation in temperature was compensated for by placing heating coils adjacent each solenoid, the heating coil adjacent one solenoid being in series with the other. By constructing these heating coils with heating characteristics corresponding to those of the solenoids, both solenoids are heated to the same temperature at all times.

An object of the present invention is to provide a new and improved electric speedometer which more accurately indicates the true speed of the vehicle at all times.

A more specific object of the invention is to provide a new and improved means for eliminating errors resulting from variations in current flow through the actuating solenoids of speed indicators of the above mentioned type.

A further object is to provide a compensating means adapted to maintain the resistance of the actuating solenoid circuits substantially constant over the range of operating values of current flowing through the solenoids.

Another object is to provide a speedometer in which the desired compensation is achieved in a simple and economical fashion.

In brief, these objects are obtained by placing in circuit with each of the solenoids a resistance having a negative temperature coefficient of resistance such that the resistance of the circuit including the two is maintained substantially constant at all times. According to this arrangement, the resistance being maintained constant, the flow of current through the solenoids is dependent only upon the position of the movable contact of the bridge circuit and is not decreased equally in both by the heating of the solenoids to the same but higher temperature as the movable contact is moved to its extreme positions.

Figure 2:
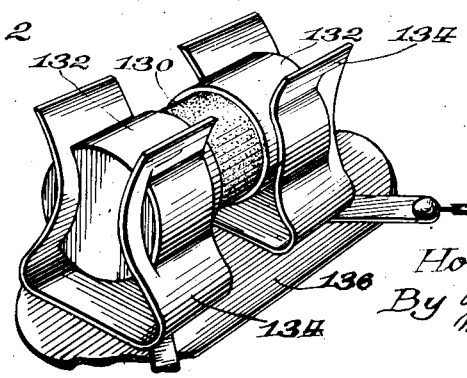

Other objects and advantages of the present invention will become apparent from the ensuing description of an embodiment thereof. In this description reference will be had to the accompanying drawing in which:

Fig. 1 is a diagrammatic representation of the various mechanical elements of a speedometer and the manner in which they are connected in the improved electrical circuit of the present invention; and Fig. 2 is a perspective view of a negative temperature coefficient resistance utilized in the circuit shown in Fig. 1.

Referring first to Fig. 1 of the drawing, there is shown an electrically operated speed indicating system comprising an indicator arm 10 adapted to be moved by an electromagnetically operated actuating means 12, the position of which is controlled by a magnetically operated current varying means 14 suitably driven from a gear 16 rotating in unison with a part such as the rear wheel of a vehicle. The various elements of the apparatus are indicated as being connected in circuit with the usual ignition system of an automobile. Energy is supplied to the apparatus from the usual automobile battery 18 under the control of an ignition switch 20, shown in its open position, to which one terminal of the battery is connected by a conductor 22. The other terminal of the battery is grounded to the frame as indicated at 24.

The ignition switch 20 is connected by conductor 26 to one end of a ballast resistance 28, the other end of which has connected thereto a pair of branch conductors 30 and 32, the former of which leads to the electromagnetically operated actuating means 12 and the latter to the magnetically operated current varying means 14. The ballast resistance 28 is made of any suitable material having a high positive temperature coefficient of resistance.

When the battery voltage is low the initial current flowing through the resistance is low, and the resistance is relatively cool and permits a predetermined value of current to flow through the indicating apparatus. However, when the voltage is high the initial current flow is relatively high and the resistance of the ballast resistance increases, thereby tending to maintain the current flow constant at said predetermined value.

The actuating mechanism 12 comprises a unitary crescent-shaped armature 34 having oppositely extending tapered portions 36 and 38 actuated by electromagnetic means, such as solenoids 40 and 42, respectively. The armature, which is constructed of laminated strips and having a cross section area sufficient to prevent magnetic saturation under all conditions of operation, may be constructed after the manner disclosed in the copending application of Willard H. Farr and George E. Coxon, Serial No. 128,734, filed March 3, 1937.

As disclosed in this application, the armature is constructed with a central portion 44 having a cross section of greater reluctance than the adjacent relatively large cross section portions of the tapered armature portions 36 and 38, whereby the movement of the armatures by the respective solenoids is limited. Each solenoid is adapted to attract its respective armature portion until the central portion 44, having a relatively larger reluctance, comes within the field thereof. Thereafter no matter how much current is supplied to the solenoids, the armature is not actuated further.

The increased reluctance may be obtained by decreasing the cross sectional area, as indicated at 44, or by utilizing non-magnetic material in this portion of the armature. The armature 34 is operatively connected to the indicator arm 10 through a suitable support 46, a shaft 48 mounting the support, gears 50 and a shaft 52 upon which the indicator arm is mounted. The solenoids 40 and 42 are connected in series with each other by a conductor 54, and have interposed in series therewith resistances 56 and 58, respectively. These resistances, which may be located at a substantial distance from the solenoids if desired, have negative temperature coefficients of resistance and resistance values proportioned to compensate for changes in the resistance of the solenoids induced by variations in current value through the solenoids, as will be described more fully hereinafter.

The series circuit, including the solenoids 40 and 42 and the resistances 56 and 58, is connected by the previously mentioned branch conductor 30 to the ballast resistance 28 and through conductor 60 to ground. The magnetically operated current varying means 14 is preferably constructed after the manner of the disclosure in the copending application of Ardern W. Le Fevre, et al., Serial No. 40,600, filed September 14, 1936. For the purpose of describing the present invention, a brief description thereof is deemed sufficient.

It comprises a suitable casing within which is mounted an annular fixed resistance 62, one terminal 64 of which is connected to conductor 32 through a terminal 66 and a spring terminal 68 cooperatively associated with the terminal 64, which is mounted in turn on a fixed insulating plate 70. The other terminal of the resistance 62 is connected by conductor 72 to the conductor 60 leading to ground. It may be seen, therefore, that the resistance 62 is connected in parallel with the series circuit including solenoids 40 and 42 and resistances 56, 58.

In order to vary the current supplied to the respective solenoids in response to variations in the speed of the vehicle, there is provided a bridge circuit comprising a conductor 76 connected to conductor 54 between the solenoids, and a movable contact 78, the position of which is made to depend upon the speed of the vehicle. The bridge circuit divides the series circuit, including the solenoids 40 and 42 and resistances 56 and 58, into two branches, one including solenoid 40 and resistance 56 and the other solenoid 42 and resistance 58. Thus as the position of the movable contact is varied, the supply of current to the solenoids is likewise varied. The amount of variation depends on the extent of the movement of contact 78 from the midpoint in which it is illustrated.

The movement of the contact 78 results in the simultaneous increase of current in one solenoid and decrease in the other, and the solenoids in which these changes occur respectively depend upon the direction of movement of the contact 78 from the midpoint of the resistance 62. The position of the movable contact is determined by the speed of rotation of a shaft 80, rotatably journaled in a die casting 82, driven from the wheel 16 and to the end of which is mounted a permanent magnet 84. The magnet is substantially annular in shape, but has its ends separated by a suitable gap which may be filled with non-magnetic material, if desired. Surrounding the magnet 84 and spaced therefrom is a field plate 86 which forms a strong magnetic field between itself and the magnet 84. In this space is located a speed cup 88 formed of aluminum or other suitable conducting material. The speed cup is mounted on a shaft 90 journaled at one end in a bearing 92 carried by and suitably insulated from the field plate 86, and at the other end in a similar bearing 94 mounted in a bearing support 96 made of brass or other non-magnetic material.

The movable contact 78 is mounted on the shaft 90 and communicates with conductor 76 through the shaft 90, conductor 98, terminal 100, spring contact 102 and terminal 104. The rotation of magnet 84 tends to rotate speed cup 88 in the same direction, but this rotation is resisted by a spring 106 having one end secured to the shaft 90 and the other to an insulating block 108 secured to the insulating plate 70.

The electrical speedometer also incorporates a mileage indicator 110 which may be of the usual drum type. This indicator is driven through a spring biased pawl 112 controlled by an electromagnet 114, one terminal of which is connected to the battery through conductor 116 and the ignition switch. The other terminal of the electromagnet 114 is connected by conductor 118 to a normally open cam actuated switch 120 adapted to be closed at predetermined distant intervals by suitable mechanism driven through gear 16. The switch 120 is grounded through conductors 122 and 60 so that the magnet is connected in parallel with resistance 62 and the series circuit, including solenoids 40 and 42.

The resistances 56 and 58 may be constructed after the manner illustrated in Fig. 2. In this figure they are shown in the form of cylindrical bars 130 of suitable resistance material, such as a silicon carbide compound or other carbon compounds having negative temperature coefficients of resistance. The resistances should be so constructed that the temperature coefficient of resistance and the value of the resistance are such that a decrease in resistance, as a result of a temperature increase, compensates for the rise in resistance of the solenoid. In other words, the solenoid and resistance are constructed with constants giving the branch circuits in which they are placed a constant resistance characteristic.

The resistances 56 and 58 may be provided with end caps or terminals 132 adapted to fit into suitable spring clips 134 mounted on a base 136 of any suitable insulating material.

In operation the ignition switch 20 is closed whenever the vehicle is to be operated. This energizes not only the speed indicating apparatus through the branch conductors 30 and 32, but also places the energization of the odometer operating electromagnet 114 under the control of the cam actuated switch 120. Thus each time the vehicle travels a predetermined distance switch 120 is closed and magnet 114 energized to operate the odometer a unit distance.

The speed indicating unit is energized constantly through the branch conductors 30 and 32. With the vehicle operating at a speed approximately half its maximum speed, such as 44 miles per hour, the indicator arm is in the illustrated position and the movable contact 78 is at the midpoint of resistance 62. Under this operating condition no current flows through the bridge circuit which includes conductor 76 and movable contact 78 and consequently the same current traverses both solenoids 40 and 42. The armature 34 thus is maintained at its mid-position as both solenoids exert equal forces on their respective armature portions 36 and 38.

As the rate of speed varies in one direction or another, the position of the movable contact 78 is changed simultaneously to increase the current in one solenoid and decrease the current in the other. The change of current flow results in the exertion of an increased force by one solenoid and a decreased force by the other, with the result that the armature 34 is moved to a different speed indicating position. The increase in current flowing through one solenoid and decrease in current flowing through the other, results in a change in temperature of the solenoid windings. The change in temperature effects a proportionate change in resistance, and if no compensation were made for this change, the speed indicator would not give a correct reading because the current supplied to the solenoids would no longer be a function of the speed alone. By placing resistances 56 and 58, which have negative temperature coefficients of resistance, in series with the solenoids, the resistance through each branch circuit, including the solenoid and its associated resistance, remains constant. Therefore, the current supplied to each solenoid remains a function of the speed alone and no errors creep into the speedometer reading. Furthermore, the movement of the contact 78 over the entire length of resistance 62 does not affect the operation of the indicator for the reason that even though the temperature of one of the solenoids thereby may be increased materially, the resistance of the branch circuit in which it is included remains constant and is not a function of the current flowing through it.

While only a single embodiment of the present invention has been described and illustrated, it is to be understood that the invention is not limited to the specific details shown in the drawing, but may assume various forms, and that the scope of invention is limited solely by the following claims.

I claim:

1. In indicating means of the class described, the combination including a shaft, an armature connected thereto, solenoids for actuating said armature in opposite directions, means including circuits individual to said solenoids for supplying current thereto, means for varying the relative strengths of the currents in said solenoids, and means for maintaining the resistances of each of said circuits constant at all times.

2. In indicating means of the class described, the combination including a shaft, an armature connected thereto, a pair of solenoids for actuating said armature in opposite directions, means including a circuit for each solenoid for supplying current to said solenoids, means for varying the relative strengths of the currents in said solenoids, and means including a resistance having a negative temperature coefficient of resistance in each of said circuits for maintaining the resistance of said circuits constant at all times.

3. In indicating means of the class described, the combination including a shaft, an armature connected thereto, a pair of solenoids having predetermined resistance and heating characteristics for actuating said armature in opposite directions, means including a circuit for each solenoid for supplying current thereto, means for varying the relative strengths of the currents in said solenoids, and means including a resistance having a negative temperature coefficient of resistance, and resistance and temperature characteristics otherwise substantially the same as the solenoids in each of said circuits for maintaining the resistance of said circuits constant at all times.

4. In indicating means of the type described, the combination of a shaft, an armature connected thereto, a pair of solenoids for actuating said armature in opposite directions, a source of electrical energy for said solenoids, means for varying the relative strengths of the currents passing through said solenoids pursuant to variation in a characteristic of a part being measured, and resistances having negative temperature coefficients of resistance in circuit with each solenoid for maintaining the combined resistance of each solenoid and resistance substantially constant irrespective of the values of current passing through said solenoids.

5. In an electric indicator of the class described, the combination including indicating means, an oscillatable shaft for operating said means, a pair of solenoids constructed of material having a positive temperature coefficient of resistance for oscillating said shaft in opposite directions, means for supplying variable currents to said solenoids, and means having a negative temperature coefficient of resistance for preventing temperature difference between said solenoids from disturbing the supply of variable currents to said solenoids.

6. In indicating means of the type described, the combination including indicating means, a rotatable shaft for actuating said indicating means, a pair of solenoids for actuating said shaft in opposite directions, a source of energy for supplying current to said solenoids, means operated in accordance with the variation of a characteristic to be indicated for varying the supply of current to said solenoids, and negative temperature coefficient resistance means in circuit with each solenoid for preventing the change in resistance of the solenoids from affecting the supply of current to said solenoids.

7. In indicating means of the type described, the combination including indicating means, a rotatable shaft for actuating said indicating means, a pair of solenoids for actuating said shaft in opposite directions, a source of energy for said solenoids, a circuit including said solenoids, a fixed resistance connected across both said solenoids and a bridge circuit leading from a point between the solenoids to said fixed resistance for supplying current to said solenoids, and means operated in response to variations in a characteristic adapted to vary the point of connection of said bridge circuit to said fixed resistance for varying the supply of current to said solenoids, and resistance means in circuit with each solenoid for maintaining the combined resistance of each solenoid and its associated resistance means substantially constant.

8. In indicating means of the type described, the combination including indicating means, a rotatable shaft for actuating said indicating means, a pair of solenoids for actuating said shaft in opposite directions, a source of energy for said solenoids, a circuit including said solenoids, a fixed resistance connected in a bridge circuit consisting of a low resistance conductor leading from a point between the solenoids in said first circuit to said fixed resistance for supplying current to said solenoids, and means operated in response to variations in a characteristic adapted to vary the point of connection of said bridge circuit to said fixed resistance for varying the supply of current to said solenoids, and resistance means in circuit with each solenoid for maintaining the combined resistance of each solenoid and its associated resistance means substantially constant.

9. In indicating means of the type described, the combination including indicating means, a rotatable shaft for actuating said indicating means, a pair of solenoids for actuating said shaft in opposite directions, a source of energy for said solenoids, a circuit including said solenoids, a fixed resistance connected across both said solenoids and a bridge circuit leading from a point between the solenoids to said fixed resistance for supplying current to said solenoids, and means operated in response to variations in a characteristic adapted to vary the point of connection of said bridge circuit to said fixed resistance for varying the supply of current to said solenoids, and resistances having a negative temperature coefficient of resistance in series with each solenoid for preventing the variations in resistance of the solenoids from varying the supply of current thereto.

10. In an electric speedometer for automotive vehicles, the combination including an indicator, a pair of opposed electromagnets for moving said indicator in opposite directions in accordance with the speed of a vehicle, a fixed resistance, a pair of resistances having negative temperature coefficients of resistance, a circuit including one of said pair of resistances in series with each electromagnet and a movable contact for connecting said electromagnets in bridge relationship to said fixed resistance, and means for varying the position of said movable contact in conformity with the speed of said vehicle, thereby to correspondingly vary the current flow through said electromagnets.

HORACE M. NORMAN.